(No Model.)
E. D. LEWIS.
ELECTRIC BRAKE.
No. 538,024. Patented Apr. 23, 1895.
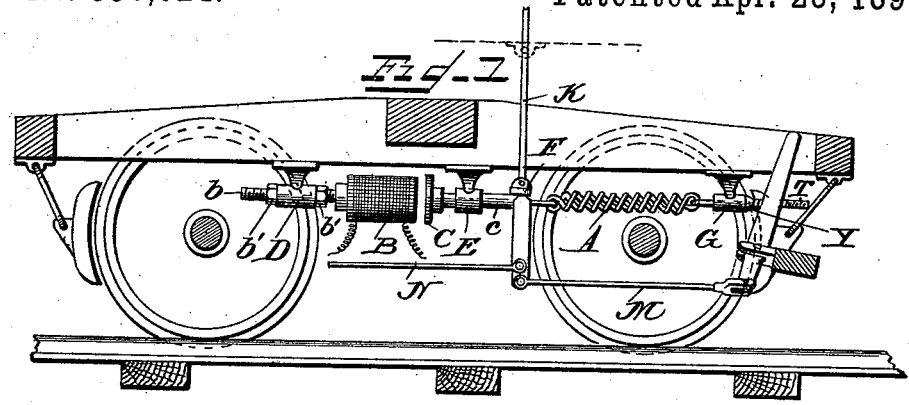
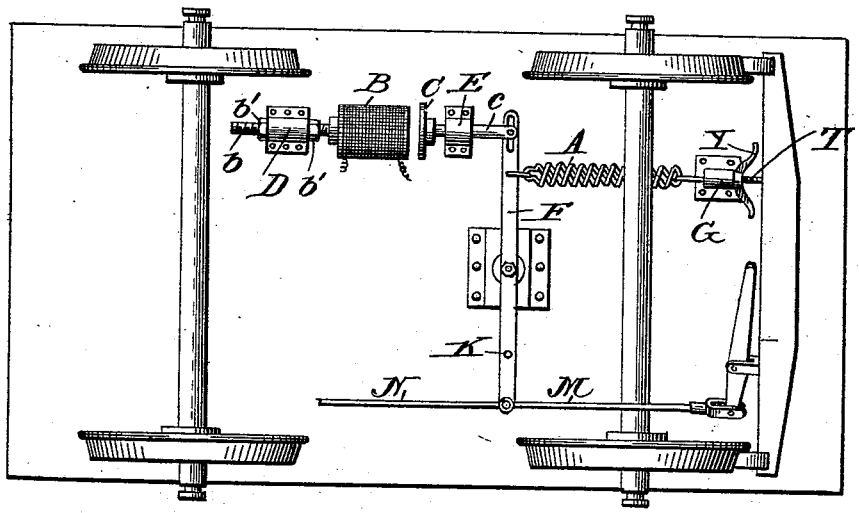
WITNESSES
F. L. Ouraud
J. Gregory
INVENTOR.
Edward D. Lewis
his Attorney.
THE NORRIS PETERS CO., PHOTO-LITHO., WASHINGTON, D. C.

UNITED STATES PATENT OFFICE.

EDWARD D. LEWIS, OF SAVONA, NEW YORK.

ELECTRIC BRAKE.

SPECIFICATION forming part of Letters Patent No. 538,024, dated April 23, 1895.

Application filed December 7, 1894. Serial No. 531,117. (No model.)

*To all whom it may concern:*

Be it known that I, EDWARD D. LEWIS, a citizen of the United States, residing at Savona, in the county of Steuben and State of New York, have invented certain new and useful Improvements in Electric Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to electric brakes as applied to street, traction, or other railways; the main object being to hold the brakes out of operative relation against a constantly acting force which when unrestrained will serve to apply the brakes.

The invention is especially adapted for such cars as are propelled by electrical energy because in the event of any accident at power house, service wire, motor, or car the brakes will be automatically applied. Again the resistance magnet generally employed for the field magnet of the motor can be economically used as the brake controlling means, thereby obviating the employment of extra magnets for this purpose. As usually practiced the brakes are normally held out of an operative position by springs, weights, or a system of levers, and when it is required to apply the brakes the current must be established, thereby requiring special attention on the part of the motorman to properly set the brakes at a critical moment.

By my invention the brakes are normally applied by substantially the same means which heretofore held them out of action and this force is overcome by electrical energy which so long as the current is established will hold it in check, but in the event of the current being interrupted by accident or from any other cause the brake applying force will regain itself and set the brakes. Obviously, other means under the control of the motorman, as a conveniently located lever, will be provided to operate the brakes independently of the brake applying force and its superior electrical energy to admit of the brakes being actuated at the will of the motorman, thereby making provision for the manual control of the brakes independently of the automatic brake controlling mechanism.

The improvement consists of the novel features which hereinafter will be more fully described and claimed, and which are shown in the accompanying drawings, in which—

Figure 1 is a side elevation of a car truck showing the application of the invention. Fig. 2 is a bottom plan view of the truck.

The truck is shown divested of the motor, the motor bearings and all parts which would tend to confuse and render obscure the application of the invention, such parts being shown only which are essential to properly illustrate the improvement.

The electro magnet B is conveniently located on the truck and is preferably adjustable in its mountings to vary its position with respect to the armature C when required. For this purpose its stem $b$ is threaded and passes loosely through a hanger or bearing D and has two binding nuts $b'$, one on each side of the said bearing D to enable the adjustment of the magnet being easily effected and the proper positioning of the same in the required location. The armature C is secured on the end of a rod $c$ loosely mounted in a bracket E and its opposite end is attached to a transverse lever F which has connection with the brake beams by means of the rods M and N. A spring A is provided as a means to normally hold the brakes applied and is connected at one end to the lever F and its opposite end is adjustably connected with a bracket G by means of a threaded stem T and a threaded winged nut Y. By this means the tension of the spring can be regulated to suit the strength of the current or for any other purpose. The lever K is attached at its lower end to the lever F and its upper end extends within convenient reach of the motorman to be operated when it is required to set or release the brakes independently of their automatic actuating mechanism. This lever K may be attached to any convenient part of the system of brake levers so long as the desired result is attained by its use.

The operation of the invention is as follows:—Under normal conditions the spring A holds the brakes set. On establishing the current the magnet B is vitalized and attracts the armature C and through the connections herein set forth overcomes the force of the spring A and releases the brakes. This condition exists so long as the current is on but when the circuit is interrupted, either by design, as when stopping the car, or by accident to the line wire or the machinery the magnet B loses its vitality and the spring A or an equivalent force regains itself and instantly and automatically applies the brakes and brings the car to a standstill. This operation takes place without any intervention of the motorman.

Having thus described my invention, what I claim as new, and desire to secure by Letters Patent, is—

In an electrical brake, the combination with the brake, a spring for normally holding the brake set, means for varying the tension of the said spring, an electro magnet disposed to normally act in opposition to the said spring to release the brakes and hold them out of action until the circuit is interrupted, and means for varying or changing the relative position of the said electro magnet, substantially as shown and described.

In testimony whereof I affix my signature in presence of two witnesses.

EDWARD D. LEWIS.

Witnesses:
 HENRY JOINT,
 A. H. STINSON.